United States Patent [19]
Bookbinder et al.

[11] Patent Number: 5,135,990
[45] Date of Patent: Aug. 4, 1992

[54] POLYETHERIMIDE-LIQUID CRYSTALLINE POLYMER BLENDS

[75] Inventors: Dana C. Bookbinder; Paul D. Sybert, both of Pittsfield, Mass.

[73] Assignee: General Electric Company, Pittsfield, Mass.

[21] Appl. No.: 593,453

[22] Filed: Oct. 5, 1990

[51] Int. Cl.$^5$ .............................................. C08L 69/00
[52] U.S. Cl. ...................................... 525/425; 525/436
[58] Field of Search .............................. 525/425, 436

[56] References Cited

U.S. PATENT DOCUMENTS

| | | | |
|---|---|---|---|
| 3,983,093 | 9/1976 | Williams, III et al. | 428/435 |
| 4,083,829 | 4/1978 | Calundann et al. | 260/49 |
| 4,141,927 | 2/1979 | White et al. | 260/860 |
| 4,161,470 | 7/1979 | Calundann | 528/206 |
| 4,184,996 | 1/1980 | Calundann | 528/190 |
| 4,219,461 | 8/1980 | Calundann | 528/173 |
| 4,238,599 | 12/1980 | Langley et al. | 528/193 |
| 4,374,228 | 2/1983 | Langley | 524/599 |
| 4,496,712 | 1/1985 | Irwin | 528/191 |
| 4,522,974 | 6/1985 | Calundann et al. | 524/605 |
| 4,548,997 | 10/1985 | Mellinger et al. | 525/433 |
| 4,673,708 | 6/1987 | Rock et al. | 525/66 |
| 4,835,047 | 5/1989 | Isayeu et al. | 525/425 |
| 4,845,184 | 7/1989 | Langer et al. | 528/193 |
| 4,847,351 | 7/1989 | Schissel | 528/193 |
| 4,871,817 | 10/1989 | Rock | 525/425 |
| 4,908,419 | 3/1990 | Holub et al. | 525/425 |

*Primary Examiner*—Paul R. Michl
*Assistant Examiner*—Edward J. Cain
*Attorney, Agent, or Firm*—Spencer D. Conard

[57] ABSTRACT

Improved blends of polyetherimide/liquid crystalline polymer are provided. The blends are obtained by melt blending amine terminated polyetherimide resin with liquid crystalline polyester resins and exhibit improved levels of tensile strength compared to blends of phthalic anhydride capped polyetherimide resin with liquid crystalline polyester resin. The blends are useful as molding compositions.

10 Claims, No Drawings

POLYETHERIMIDE-LIQUID CRYSTALLINE POLYMER BLENDS

BACKGROUND OF THE INVENTION

1. Field of the Invention

The present invention relates to polyetherimide/liquid crystalline polymer blends, and more particularly relates to blends of polyester liquid crystalline polymers and amine functional polyetherimides.

2. Description of Related Art

Polyetherimide resins exhibit high temperature properties, but generally exhibit high levels of melt viscosities. Various polyetherimide resins are set out in Williams, et. al., U.S. Pat. No. 3,983,093.

Liquid crystalline polymers are known for their properties of excellent flow rates at high temperatures and their high tensile strength.

Blends of polyetherimide resins with polyester liquid crystalline polymers exhibit higher levels of flow than polyetherimide resin alone but it is desirable to improve the tensile strength of the blends.

Accordingly, one object of the invention is to provide polyetherimide/liquid crystalline polyester blends exhibiting high levels of tensile strength.

SUMMARY OF THE INVENTION

The present invention provides blends of amine functionalized polyetherimide resin with liquid crystalline polyester resin. The blends exhibit high levels of tensile strength. The blends are useful for making molded articles.

DETAILED DESCRIPTION OF THE INVENTION

The present invention involves blends of an amine terminated polyetherimide and a liquid crystalline polyester. The blends when melt blended in an extruder at elevated temperatures may react to form an amount of polyetherimide/polyester block copolymer blended together with polyetherimide homopolymer and liquid crystalline polyester homopolymer.

The polyetherimides that can be employed in the present invention include repeating groups of the formula:

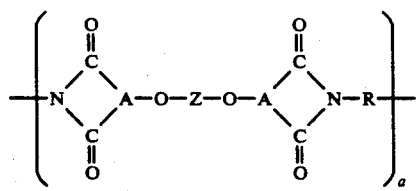
(I)

wherein "a" represents a whole number in excess of 1, e.g., 10 to 10,000 or more, the group —O—A< is selected from:

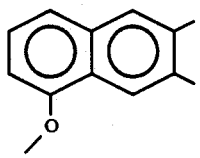
(II)

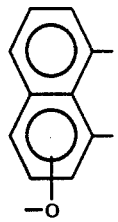

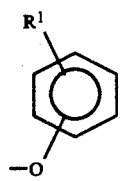

$R^1$ being hydrogen, lower alkyl or lower alkoxy. Preferably, the polyetherimide includes the latter —O—A< group where $R^1$ is hydrogen such that the polyetherimide is of the formula:

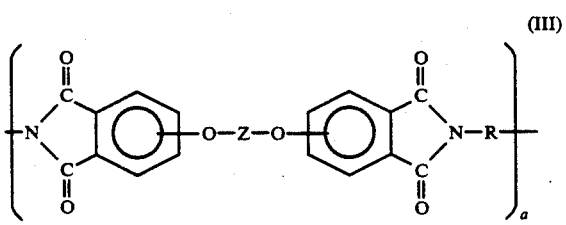
(III)

and the divalent bonds of the —O—Z—O— radical are in the 3,3', 3,4', 4,3' or the 4,4' position; Z is a member of the class consisting of (1)

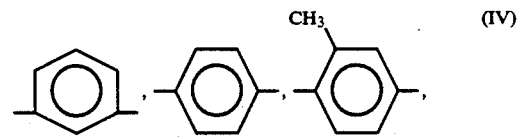
(IV)

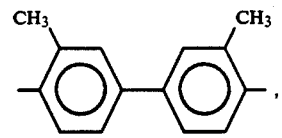

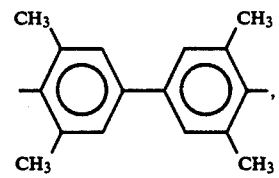

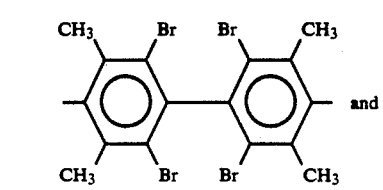
and

-continued

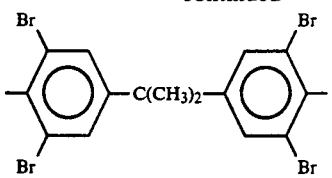

and (2) divalent organic radicals of the general formula:

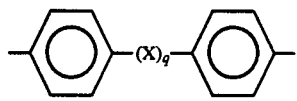
(V)

where X is a member selected from the class consisting of divalent radicals of the formulas,

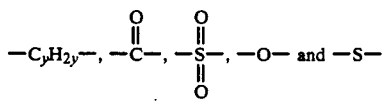
(VI)

where q is 0 or 1, y is a whole number from 1 to 5, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from 2 to about 20 carbon atoms, (3) $C_2$ to about $C_8$ alkylene terminated polydiorganosiloxane, and (4) divalent radicals included by the formula:

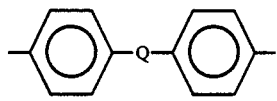
(VII)

where Q is a member selected from the class consisting of:

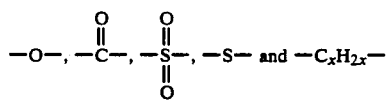
(VIII)

where x is a whole number from 1 to 5 inclusive. Particularly preferred polyetherimides for the purposes of the present invention include those wherein —O—A< and Z respectively are:

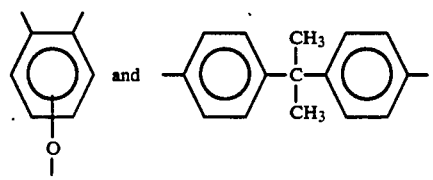
(IX)

and R is selected from:

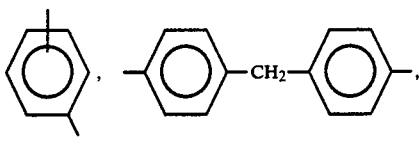
(X)

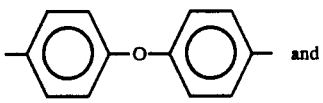
and

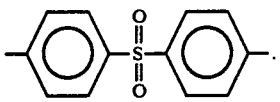

The polyetherimides wherein R is m-phenylene are most preferred.

In one embodiment of the present invention the polyetherimide may be a copolymer which, in addition to the etherimide units described above, further contains repeating units of the formula:

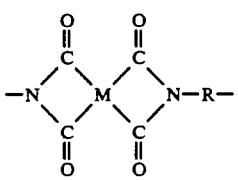
(XI)

where R is previously defined and M is selected from the group consisting of:

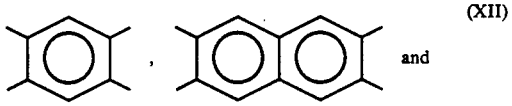
(XII)

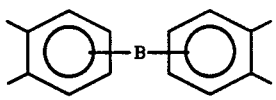

where B is —S— or

Some of these polyetherimide copolymers are described by Williams, et. al., U.S. Pat. No. 3,983,093, incorporated herein by reference.

The polyetherimides can be obtained by any of the methods well known to those skilled in the art, including the reaction of an aromatic bis(ether anhydride) of the formula:

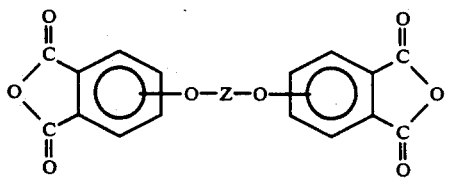 (XIII)

with an organic diamine of the formula:

 (XIV)

H₂N—R—NH₂ where Z and R are as defined hereinbefore.

Aromatic bis(ether anhydride)s of the above formula include, for example, 2,2-bis(4-(2,3-dicarboxyphenoxy)-phenyl)propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)diphenyl sulfone dianhydride; 2,2-bis(4-(3,4-dicarboxyphenoxy)phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)4'-(3,4-dicarboxyphenoxy)diphenyl-2,2-propane dianhydride; etc. and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic Compounds, Academy of Science, U.S.S.R.), U.S.S.R. 257,010, Nov. 11, 1969, Appl. May 3, 1967. In addition, dianhydrides are shown by M. M. Koton, F. S. Florinski, Zh. Org. Khin., 4(5), 774 (1968).

Organic diamines of the above formula include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminoaphthalene, 3,3'-dimethylbenzidine, 3,3'-dimethoxybenzidine, 2,4-bis(β-amino-t-butyl)toluene, bis(p-β-methyl-o-aminopentyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1-4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyldisiloxane, and the like.

Advantageously, the reactions between the dianhydrides and the diamines can be carried out employing well known solvents, e.g., o-dichlorobenzene, m-cresol/toluene, etc. at temperatures of from about 100° C. to about 250° C. Alternatively, the polyetherimides can be prepared by melt polymerization of any of the above dianhydrides with any of the above diamine compounds while heating the mixture of ingredients at elevated temperatures with concurrent intermixing. Generally, melt polymerization temperatures between about 200° C. and 400° C. and preferably 230° C. to 300° C. can be employed. The conditions of the reaction and the proportions of ingredients can be varied widely depending on the desired molecular weight, intrinsic viscosity, and solvent resistance. In general, a slight excess of diamine to dianhydride is employed for producing amine functional high molecular weight polyetherimides. By employing a molar excess (about 1 to 5 mol percent) of diamine results in the production of polyetherimides having terminal amine groups. Generally, useful polyetherimides have an intrinsic viscosity (IV) greater than 0.2 deciliters per gram, preferably 0.35 to 0.60, or 0.7 deciliters per gram or even higher when measured in m-cresol at 25° C.

Suitable liquid crystalline polyesters are shown by "Polymeric Liquid Crystals", A. Blumstein, Ed. Plenum Press, New York (1985) and U.S. Pat. Nos. 4,161,470; 4,184,996; 4,219,461; 4,238,599; 4,374,228; 4,496,712; 4,522,974; and 4,845,184; which are all incorporated herein by reference. Liquid crystalline polymers exhibit anisotropic properties in the melt.

The liquid crystal polymers are comprised of moieties which contribute at least one aromatic ring to the polymer backbone and which enable the polymer to exhibit anisotropic properties in the melt phase. Such moieties include but are not limited to aromatic diols, aromatic amines, aromatic diacids and aromatic hydroxy acids. Moieties which may be present in the liquid crystal polymers employed in the present invention (wholly aromatic or non-wholly aromatic) include but are not limited to the following:

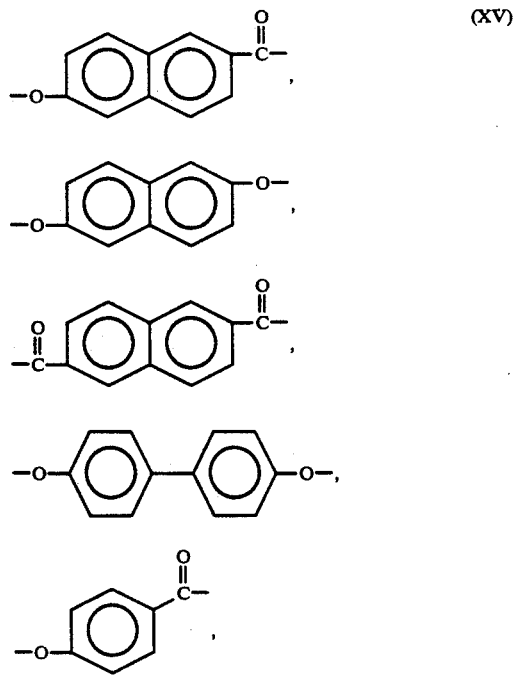 (XV)

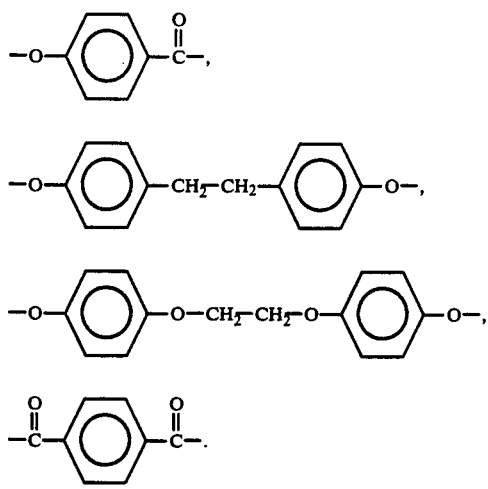

The liquid crystalline polyesters, including wholly aromatic polyesters, which are suitable for use in the present invention may be formed by a variety of ester-forming techniques whereby organic monomer compounds possessing functional groups which, upon condensation, form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants with the reaction continuing as the polymer particles are suspended therein. A vacuum may be applied to facilitate removal of volatiles formed during the final stage of the condensation (e.g., acetic acid or water).

U.S. Pat. No. 4,083,829, entitled "Melt Processable Thermotropic Wholly Aromatic Polyester," describes a slurry polymerization process which may be employed to form the wholly aromatic polyesters which are preferred for use in the present invention. According to such a process, the solid product is suspended in a heat exchange medium. The disclosure of this patent is incorporated herein by reference in its entirety.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), and gaseous acid catalysts such as Lewis acids (e.g., BF$_3$), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polymers suitable for use in the present invention tend to be substantially insoluble in common solvents and accordingly are not susceptible to solution processing. As discussed previously, they can be readily processed by common melt processing techniques. Most suitable wholly aromatic polymers are soluble in pentafluorophenol to a limited degree.

The wholly aromatic polyesters which are preferred for use in the present invention commonly exhibit a weight average molecular weight of about 2,000 to 200,000, and preferably about 10,000 to 50,000, and most preferably about 20,000 to 25,000. The wholly aromatic poly(ester-amide)s which are preferred commonly exhibit a molecular weight of about 5,000 to 50,000 and preferably about 10,000 to 30,000; e.g., 15,000 to 17,000. Such molecular weight may be determined by gel permeation chromatography as well as by standard techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters and poly(esteramide)s additionally commonly exhibit an inherent viscosity (i.e., I.V.) of at least approximately 2.0 dl./g., e.g., approximately 2.0 to 10.0 dl./g., when dissolved in a concentration of 0.1 percent by weight in pentafluorophenol at 60° C.

Especially preferred wholly aromatic polymers are those which are disclosed in above-noted U.S. Pat. Nos. 4,161,470, 4,184,996, 4,238,599 and 4,219,461.

The most preferred liquid crystalline polyester is wholly aromatic polyester which is disclosed in U.S. Pat. No. 4,161,470 is a melt processable wholly aromatic polyester capable of forming an anisotropic melt phase at a temperature below approximately 350° C. The polyester consists essentially of the recurring moieties I and II wherein:

I is

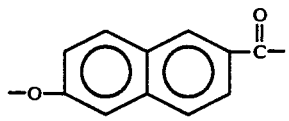 (XVI)

and II is

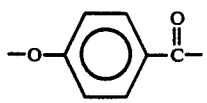 (XVII)

The polyester comprises approximately 10 to 90 mole percent of moiety I, and approximately 10 to 90 mole percent of moiety II. In a preferred embodiment, moiety II is present in a concentration of approximately 65 to 90 mole percent, and more preferably in a concentration of approximately 70 to 90 mole percent, e.g., approximately 75 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Preferably the polyetherimide as an amine functionality of from between 50 and 300 meq/kg of polyetherimide resin, more preferably between 50 and 200 meq/kg, and most preferably about 100 meq/kg. The amine terminated polyetherimide is preferably melt blended with the liquid crystalline polyester in an extruder at elevated temperatures, for example between 250° C. and 500° C., preferably between 280° C. and 400° C., and most preferably at about 380° C. It is believed that during this melt blending the amine groups on the amine terminated polyetherimide attacks the ester linkages of the liquid crystalline polyesters and thereby form amounts of polyetherimide/polyester copolymer. The melt blended mixture thus, it is believed, comprises respective amounts of polyetherimide resin, liquid crystalline polyester resin and polyetherimide/polyester copolymer.

The polyetherimide resin is preferably melt blended at a level of from 5 percent by weight to 95 percent by weight based on the total weight of polyetherimide resin and liquid crystalline polyester, more preferably at a level of from 10 percent by weight to 40 percent by weight, and most preferably at a level of 20 percent by weight and the liquid crystalline polyester is preferably melt blended at a level of from 5 percent by weight to 95 percent by weight based on the total weight of polyetherimide resin and liquid crystalline polyester resin, preferably at a level of from 60 percent by weight to 90 percent by weight and most preferably at a level of 80 percent by weight. It is believed that the resultant melt blended composition has polyetherimide resin present in the forms of homopolymer and as blocks in polyetherimide/polyester copolymers, and has polyester present in the form of homopolymer and blocks in the polyesterimide/polyester copolymers. Thus, the amount of polyetherimide present in the resultant melt blended composition in the combined forms of homopolymer and blocks in the copolymer is preferably present at a level of from 5 percent by weight to 95 percent by weight based on the total weight of polyetherimide and polyester resin, more preferably 10 percent by weight to 40 percent by weight, and most preferably 20 percent by weight; and the polyester in the combined forms of homopolymer and blocks in the copolymer is preferably present at a level of 5 percent by weight to 95 percent by weight based on the total weight of polyester and polyetherimide resin, more preferably at a level of 60 percent by weight to 90 percent by weight, and most preferably at a level of 80 percent by weight. The composition may be reinforced with, for example, glass fibers present at a level of from 5 percent by weight to 50 percent by weight, preferably 10 percent by weight to 40 percent by weight, and most preferably 30 percent by weight based on the total weight of the composition.

EXAMPLES

The following examples are provided to illustrate the present invention to those skilled in the art and is not meant to limit the scope of the invention. Examples A, B and C are comparative examples using a phthalic anhydride capped polyetherimide. Examples 1, 2 and 3 are examples of the present invention employing an amine terminated polyetherimide.

TABLE 1

| Example | PEI[a] | PEI2[b] | PEI-NH$_2$[c] | PEI2-NH$_2$[d] | LCP[e] | Tensile Strength (PSI)[f] | El %[g] |
|---|---|---|---|---|---|---|---|
| A | 20 | — | — | — | 80 | 15,700 | 3.7 |
| B | — | 20 | — | — | 80 | 19,600 | 7.3 |
| 1 | — | — | 20 | — | 80 | 22,000 | 7.2 |
| 2 | — | — | — | 20 | 80 | 21,100 | 7.7 |

[a]Phthalic anhydride capped polyetherimide resin derived from reaction of 48 mol % amounts of bisphenol-A dianhydride (2,2-bis(4-(3,4-dicarboxyphenoxy)phenyl)propane dianhydride), 49.33 mol % meta-phenylene diamine, and 2.66 mol % phthalic anhydride. Amount is percent by weight based on the total weight of PEI and LCP-PE.

[b]Phthalic anhydride capped polyetherimide resin derived from 47.78 mol % 4,4'-bis(3,4-dicarboxyphenoxy)biphenyl, 49.26 mol % 4,4'-aminodiphenylsulfone, and 2.9056 mol % phthalic-anhydride.

[c]Amine terminated polyetherimide resin derived from reaction of 2,2 bis(4-(3,4-dicarboxyphenoxy)phenyl)propane dianhydride with 2 mole % excess m-phenylene diamine.

[d]Amine terminated polyetherimide resin derived from reaction of 4,4'-bis(3,4-dicarboxyphenoxy)biphenyl with 3 mol % excess 4,4'-aminophenylsulfone.

[e]Liquid crystalline polyester derived from the reaction of

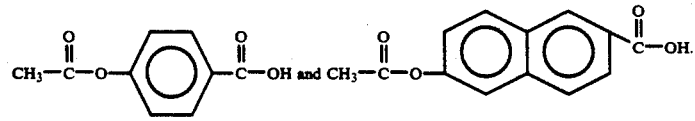

The liquid crystalline polyester is available from Celanese Corporation under the trademark VECTRA ® A950. Weight percent is based on total weight of LCP and PEI or PEI NH$_2$.

[f]Single gated tensile strength was measured in pounds per square inch (ASTM D638; type 1 tensile bar; 1800–2000 psig primary pressure; 1200–1400 psig secondary pressure; and 50 ton Boy injection molding machine).

[g]Single gated percent elongation to break (ASTM D638; type 1 tensile bar; 1800–2000 psig primary pressure; 1200–1400 psig secondary pressure; and 50 ton Boy injection molding machine).

Note that the amine terminated polyetherimide of Examples 1 and 2, when blended with the liquid crystalline polymer, exhibited substantially improved tensile strength over straight blends of polyetherimides and the LCP as shown in comparative Examples A and B.

TABLE 2

| Example | PEI[a] | PEI-NH$_2$[c] | LCP[e] | Glass[h] | DGTS[i] | DGEB[j] | HDT[k] | SF[l] |
|---|---|---|---|---|---|---|---|---|
| C | 70 | — | 30 | 30 | 2176 | 0.5 | 203 | 8.44 |

TABLE 2-continued

| Example | PEI[a] | PEI-NH[c] | LCP[e] | Glass[h] | DGTS[i] | DGEB[j] | HDT[k] | SF[l] |
|---------|--------|-----------|--------|----------|---------|---------|--------|-------|
| 3 | — | 70 | 30 | 30 | 4500 | 1.0 | 205 | 6.90 |

[h]Glass fibers—weight percent is based on total weight of PEI or PEI-NH₂, LCP and glass composition together.
[i]DGTS is double gated tensile strength in pounds per square inch (ASTM D638 with two gates; type 1 tensile bar; 1800-2000 psig primary pressure; 1200-1400 psig secondary pressure; and 50 ton Boy injection molding machine).
[j]DGEB is double gated elongation to break in percentage of length (ASTM D638 with two gates; type 1 tensile bar; 1800-2000 psig primary pressure; 1200-1400 psig secondary pressure; and 50 ton Boy injection molding machine).
[k]HDT is heat distortion temperature in °C.
[l]Spiral flow in inches at 380° C. for 0.045" × 0.25" channel.
Note that Example 3 provides substantially higher DGTS over comparative Example C.

What is claimed:

1. A composition comprising the melt blend product of:
   (a) at least one amine terminated polyetherimide resin; and
   (b) at least one liquid crystalline polyester resin which exhibits melt anisotropy.

2. The composition of claim 1 wherein said amine terminated polyetherimide is the reaction product of at least one aromatic bis(ether anhydride) and at least one diamine, said diamine being reacted in a molar excess of from 1 mole percent to 5 mole percent based on the total moles of diamine and aromatic bis(ether anhydride).

3. The composition of claim 1 further comprising from 10 percent by weight to 40 percent by weight glass fibers based on the total weight of the composition.

4. The composition of claim 1 wherein said polyetherimide resin is present at a level of from 10 percent by weight to 40 percent by weight based on the total weight of polyetherimide resin and polyester resin.

5. A melt blended composition derived from an amine terminated polyetherimide and a liquid crystalline polyester, said composition comprising:
   (a) at least one polyetherimide homopolymer;
   (b) at least one liquid crystalline polyester homopolymer; which
   (c) at least one block copolymer having polyetherimide blocks chemically combined with aromatic polyester blocks.

6. The composition of claim 5 wherein the combined weight of polyetherimide homopolymer and polyetherimide blocks is present at a level of from 10 percent by weight to 40 percent by weight based on the total weight of polyetherimide homopolymer, liquid crystalline polyester homopolymer and block copolymer in said composition.

7. A composition consisting essentially of the melt blend product of:
   (a) at least one amine terminated polyetherimide resin blended at a level of from 5 percent by weight to 95 percent by weight based on the total weight of the composition; and
   (b) at least one liquid crystalline polyester resin which exhibits melt anisotropy blended at a level of from 5 percent by weight to 95 percent by weight based on the total weight of the composition.

8. A composition consisting essentially of the melt blend product of:
   (a) at least one amine terminated polyetherimide resin blended at a level of from 5 percent by weight to 95 percent by weight based on the total weight of the composition;
   (b) at least one liquid crystalline polyester resin which exhibits melt anisotropy blended at a level of from 5 percent by weight to 95 percent by weight based on the total weight of the composition; and
   (c) from 5 percent by weight to 50 percent by weight reinforcing fibers based on the total weight of the composition.

9. The composition of claim 8 wherein said reinforcing fibers are glass fibers.

10. A composition consisting of the melt blend product of:
    (a) at least one amine terminated polyetherimide resin blended at a level of from 5 percent by weight to 95 percent by weight based on the total weight of the composition; and
    (b) at least one liquid crystalline polyester resin which exhibits melt anisotropy blended at a level of from 5 percent by weight to 95 percent by weight based on the total weight of the composition.

* * * * *